May 12, 1942. J. H. MURCH 2,282,339
ELECTRIC WELDING
Filed April 20, 1940
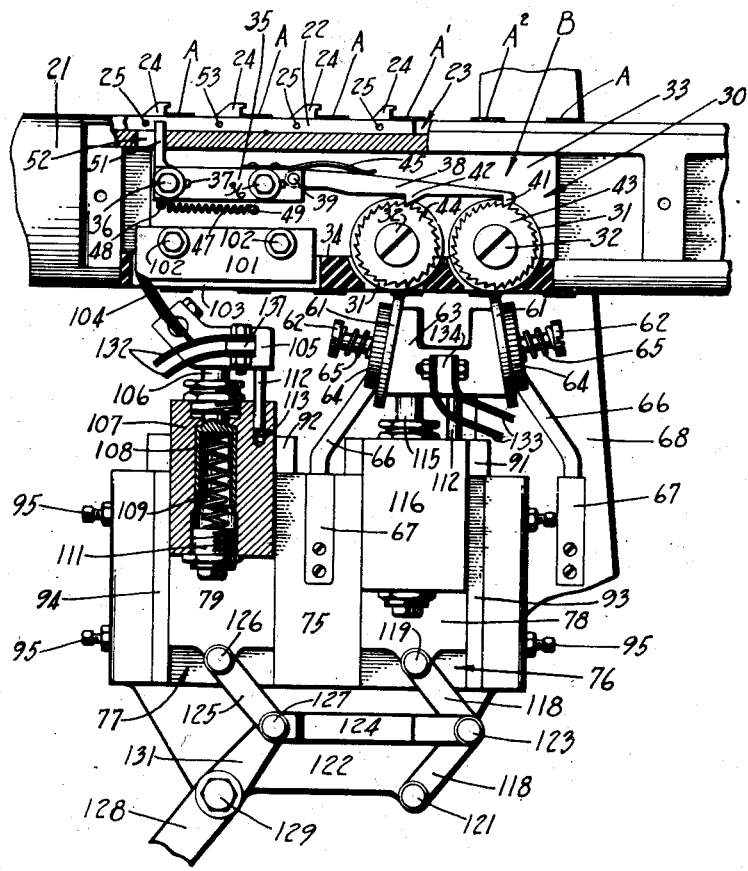
INVENTOR.
John H. Murch
BY
ATTORNEYS Patented May 12, 1942

2,282,339

UNITED STATES PATENT OFFICE 2,282,339

ELECTRIC WELDING

John H. Murch, East Orange, N. J., assignor to American Can Company, New York, N. Y., a corporation of New Jersey Application April 20, 1940, Serial No. 330,762

8 Claims. (Cl. 219—6)

The present invention relates in general to spot welding machines and has particular reference to the simultaneous spot welding of the side seams of two can bodies and to a two step welding treatment which produces can bodies as an incident to further can forming operations, the invention being particularly adapted for welding treatment of relatively short height can bodies. In some respects the present invention is an improvement of the J. A. Toleik Patent 1,773,892, issued by the United States Patent Office on August 26, 1930, and relating to Electric welding.

An object of the invention is the provision of a spot welding unit for incorporation in a can body making machine or other apparatus wherein the tubular can bodies are presented for spot welding in rapidly moving processional order and wherein two adjacent bodies are acted upon in a relatively small space and at high speed so that short height can bodies may be handled in the body maker in the regular way and may be rapidly spot welded as desired.

Another object of the invention is the provision of such a welding unit for spot welding tubular can body seams in two operations, the unit comprising double sets of electrodes located relatively close together and adapting the machine for the simultaneous spot welding of the front seam end of a short height body and the rear seam end of the next adjacent body in the rear of the procession, the rear body after having its rear seam edge tack welded being moved to the position occupied by the former front body for the second operation, at which time it will have the front edge of its side seam tack or spot welded simultaneously with the spot welding of the rear seam edge of a succeeding otherwise unwelded tubular can body.

Numerous other objects and advantages of the invention will be apparent as it is better understood from the following description, which, taken in connection with the accompanying drawing, discloses a preferred embodiment thereof.

The single view in the drawing shows an elevation of the principal parts of the welding unit embodying the present invention such a unit being applied to a can body making horn with parts shown in section.

In the Toleik patent referred to above can bodies having inner hooked blank edges with lapped sections which constitute the body side seam, after being tack or spot welded to hold the parts closely together, may be subsequently soldered or otherwise more completely joined.

In the present embodiment of the invention similar combination lock and lap seams formed in the can body undergoing treatment may be used. When can bodies of very short height are used, in some instances the entire seam is lapped and there are no locked sections. In such cases it is necessary merely to provide outside guide rails and sizing wings in addition to the regular body maker parts illustrated.

The spot welding of the can body seams is in no way concerned with whether the seam is fully lapped, fully locked or is a combination of lock and lap sections. The necessary guide rails and sizing side wings required where the seam is fully lapped are well known parts of the conventional can body making machine and it is believed further reference to this feature is unnecessary. It will be understood, therefore, that the welding unit illustrated in the drawing by way of example is adaptable for spot welding can bodies having any of the aforementioned types of seam.

In the drawing there is disclosed a mandrel or horn 21 which may be a part of a conventional body making machine. Can bodies A may be formed on the horn 21 in any suitable manner and as received in a welding station B of the present apparatus are ready for welding without further treatment.

In reaching the welding station B the can bodies A are advanced by a feed bar 22 which has sliding movement in a groove 23 formed in the top of the horn 21. Such a feed bar 22 carries the usual spring pressed feed dogs 24, these dogs being pivoted on pins 25 and being arranged to normally extend above the feed bar 22 and in engagement with the rear edge of the can body A.

Such a feed bar is reciprocated in any suitable manner and on the forward stroke advances the can bodies A along the horn in processional order. On the return stroke of the feed bar, the feed dogs 24 swing back below the top edge of the bar pivoting on the pins 25. In this position each dog passes under the blank which it will next engage and comes into position behind said blank for the next forward stroke. In this manner the blanks A are intermittently advanced along the length of the horn, this being a usual can body feeding construction.

The welding operation which is performed at station B takes place during the pause in feeding, i. e., at the rest period of the can body advancement. Each body is present in the welding station for two welding operations. In the first of these operations the body occupies the rear of two positions in the station. At such time its rear seam edge is tack welded, following which the rear can body is advanced, at the next step movement of the feed bar 22, into the forward position at the welding station. The next welding operation thereupon spot welds the forward seam edge of the can so that when it is further advanced along the horn after leaving the welding station, its side seam is spot welded both at the front and in the rear.

The horn 21 is centrally recessed as shown at 30, this recess extending throughout the length of the welding station B and back toward the rear end of the horn 21 for a further distance. A pair of welding disc electrodes 31 are mounted side by side on the inside of the horn and within the recess 30, each electrode being rotatably mounted on a pin 32 which is anchored in a central web part 33 of the horn 21. The outer periphery of each electrode 31 extends at the bottom to the peripheral bottom surface of the horn 21 and the two can bodies at the welding station B during the welding operation rest in tangential contact with these electrodes.

The can body occupying the rear position at station B is indicated as A' and the can body in the forward position as A². The electrodes 31 are in such position that the rear can body A' contacts the rear electrode 31 at the back edge of its side seam. In a similar manner the front can body A² has tangential contact with the forward electrode adjacent the forward edge of its side seam.

At the bottom of the horn an insulating member 34 is inserted in the recess 30 in order to partially close off the recess at the bottom. Such insulating member is cut out to clear the two electrodes 31 so that each electrode may properly engage its associated can body A' or A² when these bodies are at the welding station.

Provision is made for changing the position of the welding surface of the two electrodes following each welding operation. This movement is provided by a pawl mechanism located in the recess 30 of the horn and actuated by the reciprocating feed bar 22. Such a pawl mechanism comprises a reciprocating slide 35 mounted on shoulder screws 36 which are anchored in the web wall 33 of the horn at the rear end of the horn recess. Shoulder screws 36 extend through slots 37 cut through the slide 35.

A pawl member 38 is pivoted at 39 on the forward end of the slide 35 and extends forward into a position over the two electrodes 31. The pawl 38 is formed with a front tooth 41 and an intermediate tooth 42 and these teeth overlie and engage the teeth of ratchets 43, 44 secured to the sides of the respective electrodes 31. The pawl teeth are pressed into operative connection with the teeth of the ratchets 43, 44 by a leaf spring 45. Such a spring is pinned to the slide 35 and projects forwardly over and engages the pawl.

The slide 35 is normally pulled forward, that is toward the right as viewed in the drawing, by a spring 47. Such a spring is made fast at its rear end to a pin 48 extending down from the slide member and at its forward end to a stud 49 which is fixed in the web 33 of the horn.

An arm 51 formed on the slide 35 extends up through a slot 52 cut in the top of the horn, the arm where it is above the wall of the horn extending alongside of the feed bar 22. One of the feed dog pivot pins 25, this particular pin being marked 53 to distinguish it from the others, is projected laterally from the feed bar 22. When the bar is moved back on its rear or return stroke, the pin 53 strikes the arm 51 and shifts the slide 35 back, this being just as the feed bar comes to the end of its backward stroke.

The slots 37 permit this movement of the slide 35 and the teeth 41, 42 of the pawl 38 which are then in engagement with the teeth of the ratchets 43, 44, turn the electrodes counter-clockwise, as viewed in the drawing. This movement of the slide takes place against the tension of the spring 47 and as a result thereof a new welding surface of the electrodes 31 is presented.

Upon the following forward travel of the feed bar 22 the pin 53 leaves the arm 51 and the spring 47 thereupon pulls the slide 35 and its pawl forward until the arm strikes the forward edge of the slot 52, this being the position shown in the drawing. In arriving at this position the spring 45 yields sufficiently to permit the pawl 38 to pivot on its pin 39 so that the pawl teeth 41, 42 pass over and engage into adjacent teeth of the respective ratchets 43, 44.

Outer electrodes 61 are adapted to cooperate with the electrodes 31 in performing the welding operation. The electrodes 61 are shown as circular discs which are rotatably mounted upon pins 62. These pins are anchored in a cross head 63 which is disposed below the horn 21 at the welding station B. The two electrodes 61 are adapted to be brought into engagement with the two can bodies A', A² located at the welding station. Following each welding operation electrodes 61, like the inner electrodes, are rotated on their mountings 62 to change the welding surfaces for each subsequent welding operation.

For this purpose each electrode 61 is fixed to and carries a ratchet 64 and each electrode and ratchet are yieldingly held against the contacting face of the cross head 63 by a spring 65 which is mounted on the pivot pin 62. The teeth of each ratchet 64 are adapted to be engaged by a suitable toothed end of a bar 66 which is mounted at 67 on a stationary frame 68 which may be a part of the main frame of the apparatus.

To give the necessary motion for this shifting of the electrode 61 and to bring each electrode into contact with its associated can body for cooperation with its corresponding electrode 31, the cross head 63 is adapted to be raised and lowered in synchronism with the operation of the feed bar 22. This movement of the cross head 63 is timed so that the electrodes 61 are brought into welding position immediately after the can bodies A' and A² at the welding station B come to rest in their intermittent advancement along the body maker horn 21.

A slide block or support 75 is disposed below the horn 21 and is preferably an integral part of the machine frame 68. Such a support 75 constitutes a guide member for movable parts associated with the welding operation. For this purpose guide member 75 is provided with two guideways 76, 77 in which are mounted reciprocating slides 78, 79. The slide parts 78, 79 are preferably provided with tongue sections 91, 92 which fit within corresponding groove parts in the guideways 76, 77. Slide gibs 93, 94 are also provided for more even holding action of the slide members 91, 92 and these may be adjusted by adjusting screws 95 threadedly secured in the support member 75.

The slide 78 carries the cross head 63 and the outer electrodes 61 and the slide 79 carries an electrical contact member for engaging a part of the horn 21 to complete the electric welding unit at the time of welding. This contact member will first be considered.

The horn 21 may be grounded to one side of the electric welding circuit. A special fixed contact member or block 101 is mounted in the rear part of the recess 30 of the horn. Such a member is anchored to the web 33 by bolts 102. The insulation 34 which closes off the bottom of the horn recess is slotted at 103 and this permits a movable contact member 104 to pass up into the horn and into electrical engagement with the block. Contact is made when the slide 79 is raised.

The movable contact member 104 is carried in a contact head 105 which is mounted on the upper end of a slide rod 106 which extends down into a slide block section 107 carried by the slide 79. The lower end of the rod 106 is enlarged at 108 and is hollowed out to partially enclose a spring 109 which is held in the hollow end of the rod by a screw plug 111 threadedly secured to the block 107. This provides a yieldable mounting for the movable contact member 104 and permits engagement of the contact member with the stationary horn contact block 101 and allows for a further raising of the slide 79 without detaching these parts. The head 105 also carries a depending pilot pin 112 which has sliding movement in a bore 113 formed in the block 107. This prevents turning of the rod 106 within the block.

The cross head 63 is mounted in a similar manner upon a rod 115 which corresponds in construction to the rod 106 of the contact member 104. Such a rod 115 is yieldably mounted in a block section 116 of the slide 78. This insures a proper engagement of the electrodes 61 against the seam of the can bodies being welded and permits excessive lifting movement of the slide 78 without disturbing the contact of the electrodes with the work.

The two slides 78, 79 are adapted to be lifted in unison and this is accomplished by operation of a toggle system connected with the lower ends of the slides. A pair of links 118 are used for the slide 78, the upper end of one of the links being pivoted at 119 to the slide 78. The lower end of the opposite link 118 is pivoted at 121 to a depending plate section 122 of the support member 75. The two links 118 are pivotally connected at 123. This pivot connection 123 also provides for pivotal engagement with a connecting link 124 which is associated with similar links for the slide 79.

A link 125 at the top is pivotally connected at 126 to the slide 79 and at its opposite end at 127 to the link 124. Link 125 is the same length as the links 118. An actuating lever 128 is pivoted at 129 to the frame part 122 and includes an extension 131 the outer end of which has pivotal connection with the parts 124, 125 at the common pivot 127. The arm 131 is the same length between pivotal centers 127, 129 as the links 118 and 125.

This therefore provides a system of parallel link coordination so that when the lever 128 is moved in a counter-clockwise direction or to the right as illustrated, the slides 78, 79 are simultaneously raised into the operating or welding position illustrated in the drawing. After the welding operation has been completed the lever 128 is moved in the reverse or clockwise direction and this, operating through the system of links, simultaneously lowers the two slide members 78, 79.

This lowering action removes the outer electrode 61 from contact with the work and at the same time allows for the bar 66 associated with each outer electrode to operate against its corresponding ratchet 64 to rotate the associated electrode 61 so that a new surface will be presented for the next welding operation.

The timing of the machine is such as to repeatedly weld two can bodies each time such bodies are positioned at the station B. Each welding operation therefore follows as a result of raising the cross head 63 with its electrodes 61 and by completing the electrical circuit at the contact members 104 and 101. The slide block 107 is preferably insulated from the slide 79 by being formed of electrical insulating material. In a similar manner the block section 116 of the slide 78 may also be formed of insulating material.

It is believed that detailed explanation of the wiring circuits is unnecessary in view of the similarity of the present construction with usual welding circuits as in the aforesaid Toleik patent. One side of a suitable electrical circuit may be made by contact directly with a contact member 137 formed in the block 105 by means of a flexible connector 132. The other side of the welding circuit may include connection directly with the cross head 63 through a flexible connector 133 which is bolted to a contact member 134 extended out from the cross head.

In this manner the proper welding energy is caused to flow between each set of inner and outer electrodes 31, 61, the welding heat being concentrated at the side seam of each of the two can bodies while resting upon the horn 21. Two such welding operations with the changing of can bodies between the electrodes thus make two spot welds on each side seam.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for simultaneously welding separate can bodies and the like, the combination of a horn for supporting a plurality of can bodies to be welded, each of said bodies having contacting areas constituting body side seams, means for moving said can bodies in a continuous procession along said horn with their side seams following a predetermined path of travel, a welding device comprising a double pair of electrodes arranged inside and outside of said horn respectively and in the path of travel of the said side seams, and means for producing relative motion between the inner and the outer of said electrodes for a welding operation to simultaneously tack weld spaced seam areas of separate can bodies.

2. In a machine for simultaneously welding separate can bodies and the like, the combination of a horn for supporting a plurality of can bodies to be welded, each of said bodies having contacting areas constituting body side seams, means for moving said can bodies in a continuous procession along said horn with their side seams at the bottom of the horn, a pair of inner electrodes located inside of said horn and adapted to simultaneously engage inside of the side seams of two separate can bodies, a pair of outer electrodes located beneath said horn and adapted to simultaneously engage below and against the said side seams of said separate can bodies and to cooperate with said inner electrodes to perform a welding operation on said body seams, and means for moving said outer electrodes into welding position on said seams to simultaneously tack weld parts of both seams of said separate can bodies.

3. In a machine for simultaneously welding the side seams of separate can bodies and the like, the combination of a horn for supporting a plurality of can bodies to be welded, each of said bodies having contacting areas constituting body side seams, feeding devices for advancing said can bodies in spaced relation along said horn with their side seams following a common path of travel, inner welding electrodes arranged inside of said horn in the path of travel of said seams and in position to be engaged by the side seam area of two adjacent and separate can bodies when the latter are fed into welding position, outer welding electrodes arranged outside of said horn and adapted to be moved into the path of travel of said body side seams, and means for simultaneously clamping the side seams of said adjacent can bodies which are in said welding position between an inner and an outer electrode to effect a welding operation simultaneously on the two can bodies.

4. In a machine for simultaneously welding the side seams of separate can bodies and the like, the combination of a horn for supporting a plurality of can bodies to be welded, each of said bodies having contacting areas constituting body side seams, feeding devices for advancing said can bodies in spaced relation along said horn with their side seams following a common path of travel, a plurality of spaced inner rotative welding disc electrodes arranged inside of said horn in the path of travel of said seams and in position to be engaged by the side seam area of two adjacent and separate can bodies when the latter are fed into welding position, a plurality of spaced outer rotatable welding disc electrodes arranged outside of said horn and adapted to be moved into the path of travel of said body side seams, means for simultaneously clamping the side seams of said adjacent can bodies which are in said welding position between said inner and outer disc electrodes to effect a welding operation simultaneously on the two separate can bodies, and means for rotating said electrodes between welding operations.

5. In a machine for simultaneously welding the side seams of separate can bodies and the like, the combination of a horn for supporting a plurality of can bodies to be welded, each of said bodies having contacting areas constituting body side seams, feeding devices for advancing said can bodies in spaced relation along said horn with their side seams following a common path of travel and for simultaneously bringing two adjacent and separate can bodies into welding position, a pair of spaced inner welding electrode discs rotatably mounted in said horn with one disc above and in contact with each separately positioned can body seam, a slide member mounted below said horn, a pair of outer welding electrode discs rotatably mounted on said slide member, and means for raising said slide to bring said outer electrodes respectively against the side seams of said separate can bodies while in welding position and to clamp each engaged side seam section against its respective engaged inner electrode to effect a welding operation simultaneously on the two independent can bodies.

6. In a machine for simultaneously welding the side seams of separate can bodies and the like, the combination of a horn for supporting a plurality of can bodies for welding, said horn constituting a part of a welding circuit, each of said bodies having contacting areas constituting body side seams, feeding devices for advancing can bodies in spaced relation along said horn with their side seams following a common path of travel and for simultaneously bringing two adjacent and separate can bodies into welding position, a pair of spaced inner welding electrode discs rotatably mounted in said horn with said discs above and disposed respectively in contact with the side seams of said positioned separate can bodies, a slide member mounted below said horn and constituting a part of the welding circuit, a pair of outer welding electrode discs rotatably mounted on said slide member and spaced apart substantially the same distance as said inner electrode discs, a contact member also carried in said slide member and electrically insulated from said outer electrodes, and means for raising said slide member to bring said outer electrodes respectively against said can body side seams and to bring said contact member into electrical contact with said horn, whereupon the welding current flowing between each inner and outer electrode simultaneously welds the side seams of the two spaced and positioned separate can bodies.

7. In a machine for simultaneously welding the side seams of separate can bodies and the like, the combination of a horn for supporting a plurality of can bodies to be welded, each of said bodies having contacting areas which constitute body side seams, a pair of inner spaced electrodes located in said horn at a welding station, feeding devices for intermittently advancing can bodies along said horn, said feeding action terminating to place two separate and adjacent can bodies in said welding station with their side seams respectively in contact with said spaced inner electrodes, a pair of outer electrodes located at said welding station disposed outside of said horn each in alignment with a said inner electrode, and means for simultaneously moving said outer electrodes respectively against the two separate can body side seams to hold such seam parts respectively between an inner and an outer electrode for a simultaneous welding operation on both can bodies.

8. In a machine for simultaneously welding the side seams of separate can bodies and the like, the combination of a horn for supporting a plurality of can bodies to be welded, each of said bodies having contacting areas which constitute body side seams, a pair of inner longitudinally spaced electrodes located in said horn at a welding station, a forward electrode engaging the side seam of the first and forwardly disposed of a pair of separate and spaced can bodies at said welding station while the other electrode engages the side seam of the rearmost of said bodies, a pair of outer electrodes located at said welding station and disposed outside of said horn respectively in alignment with said inner electrodes, means for moving said outer electrodes simultaneously and respectively against the two can body side seams to hold such seam parts of said separate can bodies respectively between an inner and an outer electrode for a welding operation wherein the forward can body seam is welded at its front edge only and the rear can body seam is simultaneously welded at its rear edge only, and feeding devices for simultaneously moving said forward can body out of said welding station and said rear can body into the forward position therein while at the same time advancing a succeeding can body into the rear position of said welding station for a succeeding welding operation, whereby the first can body occupying the forward position at said station will have its side seam welded at both its front and rear edges and said succeeding can body is welded at its rear edge only.

JOHN H. MURCH.